United States Patent
Johnson et al.

(10) Patent No.: US 10,242,027 B2
(45) Date of Patent: Mar. 26, 2019

(54) THREE PHASE COMMIT FOR A DISTRIBUTED FILE SYSTEM

(71) Applicant: HEWLETT PACKARD ENTERPRISE DEVELOPMENT LP, Houston, TX (US)

(72) Inventors: Charles S. Johnson, Palo Alto, CA (US); Charles B Morrey, III, Palo Alto, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 54 days.

(21) Appl. No.: 15/327,445

(22) PCT Filed: Aug. 15, 2014

(86) PCT No.: PCT/US2014/051187
§ 371 (c)(1),
(2) Date: Jan. 19, 2017

(87) PCT Pub. No.: WO2016/024986
PCT Pub. Date: Feb. 18, 2016

(65) Prior Publication Data
US 2017/0177617 A1    Jun. 22, 2017

(51) Int. Cl.
*G06F 17/30* (2006.01)
*G06F 11/14* (2006.01)

(52) U.S. Cl.
CPC .... *G06F 17/30227* (2013.01); *G06F 11/1451* (2013.01); *G06F 11/1464* (2013.01);
(Continued)

(58) Field of Classification Search
CPC ..... G06F 11/00; G06F 17/30; G06F 17/30227
(Continued)

(56) References Cited

U.S. PATENT DOCUMENTS

| 6,338,146 B1 * | 1/2002 | Johnson ............. G06F 11/2043 714/13 |
| 7,206,805 B1 * | 4/2007 | McLaughlin, Jr. ..... G06F 9/466 707/999.01 |

(Continued)

FOREIGN PATENT DOCUMENTS

| CN | 102750322 A | 10/2012 |
| WO | WO-2007103405 A2 | 9/2007 |

OTHER PUBLICATIONS

Byun, T. et al., "Nonblocking Two-phase Commit Protocol to Avoid Unnecessary Transaction Abort for Distributed Systems," (Research Paper), Journal of Systems Architecture 43.1, 1997, pp. 245-254, available at http://www.sciencedirect.com/science/article/pii/S1383762196000951.

(Continued)

*Primary Examiner* — Kamini B Patel
(74) *Attorney, Agent, or Firm* — Hewlett Packard Enterprise Patent Department

(57) ABSTRACT

A technique includes using a primary commit coordinator in a distributed file system as a participant in at least one transaction associated with a file operation to commit the transaction(s) to an associated storage segment of the file system. The primary commit coordinator is used to communicate with at least one other participant in the transaction(s) using a three phase commit protocol to generate transaction states associated with committing the transaction(s). The technique includes selectively checkpointing the transaction states to a backup commit coordinator that is associated with the primary commit coordinator to allow the backup commit coordinator to takeover committing the transaction.

15 Claims, 9 Drawing Sheets

(52) U.S. Cl.
CPC ...... *G06F 11/1469* (2013.01); *G06F 11/1471* (2013.01); *G06F 11/1474* (2013.01); *G06F 17/30194* (2013.01); *G06F 2201/805* (2013.01); *G06F 2201/84* (2013.01)

(58) Field of Classification Search
USPC .......................................... 707/609; 714/16
See application file for complete search history.

(56) References Cited

U.S. PATENT DOCUMENTS

| | | | |
|---|---|---|---|
| 7,290,056 B1* | 10/2007 | McLaughlin, Jr. | ........................ H04L 43/0852 709/201 |
| 7,478,400 B1 | 1/2009 | Banerjee et al. | |
| 7,900,085 B2 | 3/2011 | Little | |
| 8,271,448 B2* | 9/2012 | Parkinson | ............... G06F 9/466 707/610 |
| 8,296,358 B2 | 10/2012 | Zuckerman et al. | |
| 8,458,238 B2 | 6/2013 | Soulier et al. | |
| 8,589,362 B1 | 11/2013 | Braam et al. | |
| 8,621,275 B1* | 12/2013 | Havemose | .......... G06F 11/1448 714/13 |
| 9,043,640 B1* | 5/2015 | Havemose | ............ G06F 11/203 707/610 |
| 2004/0225915 A1* | 11/2004 | Johnson | .............. G06F 11/2007 714/13 |
| 2005/0187891 A1* | 8/2005 | Johnson | ................ G06F 11/202 |
| 2006/0095438 A1 | 5/2006 | Fachan et al. | |
| 2007/0073621 A1* | 3/2007 | Dulin | ..................... G06F 21/33 705/50 |
| 2009/0300405 A1* | 12/2009 | Little | .................... G06F 11/203 714/3 |
| 2012/0036161 A1 | 2/2012 | Lacapra et al. | |
| 2014/0019405 A1* | 1/2014 | Borthakur | ......... G06F 17/30194 707/609 |

OTHER PUBLICATIONS

International Search Report & Written Opinion received in PCT Application No. PCT/US2014/051187, dated Apr. 21, 2015, 9 pages.

Jamuna, P. et al., "Backup Two Phase Commit Protocol (B2PC) Renders the Trustworthy Coordination Problem Over Distributed," (Research Paper), Sep. 2012, vol. 2, No. 9, pp. 225-223, available at http://www.ijarcsse.com/docs/papers/9_September2012/Volume_2_issue_9/V2I900202.pdf.

Manikandan, V. et al., "An Efficient Non Blocking Two Phase Commit Protocol for Distributed Transactions," (Research Paper), May-Jun. 2012, pp. 788-791, vol. 2, No. 3, available at http://www.ijmer.com/papers/vol2_issue3/AK23788791.pdf.

Reddy, P. K. et al., "Reducing the Blocking in Two-phase Commit with Backup Sites," (Research Paper), Information Processing Letters 86.1, 2003, pp. 39-47, available at http://www.sciencedirect.com/science/article/pii/S0020019002004490.

Ji Zhang, "Context-Based File Systems and Spatial Query Applications," Dissertation, May 5, 2013, pp. 1-178, Auburn University, Auburn, Alabama, USA.

Margo I. Seltzer et al., "Journaling Versus Soft Updates: Asynchronous Meta-data Protection in File Systems," Feb. 6, 2002, pp. 1-14 (online), USENIX, Retrieved from the Internet on Nov. 12, 2013 at URL: <usenix.org/legacy/event/usenix2000/general/full_papers/seltzer/seltzer_html/index.html>.

Zhihua Fan et al., "A Failure Recovery Mechanism for Distributed Metadata Servers in DCFS2," Jul. 2004, pp. 1-7, IEEE.

* cited by examiner

THREE PHASE COMMIT FOR A DISTRIBUTED FILE SYSTEM

BACKGROUND

In a distributed file system, files and folders are stored across multiple storage nodes. A typical distributed file system may employ measures to commit, or make permanent, file operation transactions. These transactions may be part of operations to rename a file, create a file, and so forth.

DETAILED DESCRIPTION

In accordance with example implementations, a distributed file system that is disclosed herein uses a three phase commit protocol and inter-node communication for purposes of processing file operation transactions. The distributed file system is constructed so that storage nodes of the system have consistent views of file system data and receive responses whether given file operation transactions have succeeded or failed. Moreover, the distributed file system provides partition tolerance for purposes of facilitating the takeover of a given primary storage node by a backup node should the primary storage node fail.

Figure 1:
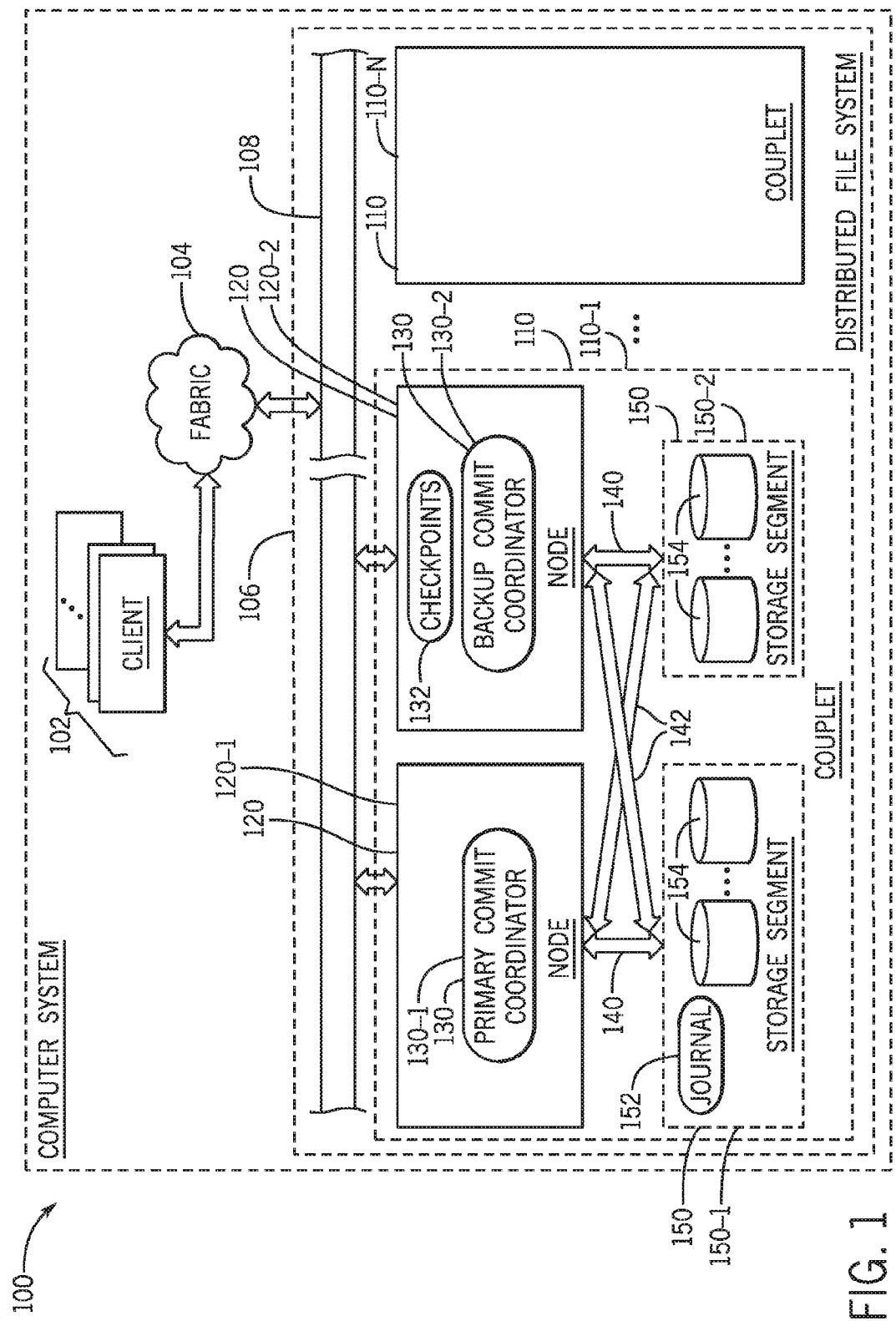
FIG. 1 is a schematic diagram of a computer system that contains a distributed file system according to an example implementation.

Referring to FIG. 1, as a more specific example, a distributed file system 106 includes storage nodes 120 (nodes 120-1 and 120-2, being depicted as examples in FIG. 1), which are each associated with storage segments 150 (storage segments 150-1 and 150-2, being depicted in FIG. 1 as being associated with the nodes 120-1 and 120-2, respectively). For example implementations that are disclosed herein, the nodes 120 are arranged, or paired together, to form N couplets 110 (example couplets 110-1 and 110-N, being depicted in FIG. 1).

In general, each couplet 110 contains two nodes 120 and two associated storage segments 150. The couplet 110 defines a takeover pair, with one of the nodes 120 being the "primary" node, and the other node 120 being the "backup" node.

The nodes 120 contain commit coordinators 130, which, as their names imply, regulate the committing of file transactions for the nodes 120. In accordance with example implementations, the primary node 120 for a given couplet 110 contains a primary commit coordinator, such as example primary commit coordinator 130-1, and the backup node 120 for the couplet 110 contains a backup commit coordinator, such as example backup commit coordinator 130-2. The primary commit coordinator 130-1 and the backup commit coordinator 130-2 are associated with file storage segments 150-1 and 150-2, respectively, for the example implementation that is depicted in FIG. 1.

The primary commit coordinator 130-1 is responsible for committing, or making permanent, file transactions by storing these transactions in the associated storage segment 150-1. Using techniques that are disclosed herein, the actions taken by the primary commit coordinator 130-1 allow takeover of commit coordination by the backup commit coordinator 130-2, should the primary commit coordinator 130-1 fail.

The primary 130-1 and backup 130-2 commit coordinators define a coordinator pair, which are coupled together via a communication fabric 108 (Ethernet fabric, as an example) for purposes of communicating messages between the coordinators 130-1 and 130-2, as well as communicating messages with other nodes of the distributed file system 106. As described herein, these messages include messages pertaining to a three phase commit protocol, as well as messages pertaining to checkpointing.

In addition to being coupled by the fabric 108 to communicate inter-node messages, the primary 130-1 and backup 130-2 coordinators may also be, in accordance with example implementations, coupled to each other's associated local storage. For example, as depicted in FIG. 1, the primary commit coordinator 130-1 has a communication path 140 to its associated storage segment 150-1; and the primary commit coordinator 130-1 also has a communication path 142 to the other storage segment 150-2 associated with the coordinator 130-2. Likewise, the backup commit coordinator 130-2 has communication paths 140 and 142 to the storage segments 150-2 and 150-1, respectively. Due to this relationship, should the primary commit coordinator 130-1 fail, the backup commit coordinator 130-2 has takeover access to the storage segment 150-1.

In accordance with example implementations, the communication paths 140 and 142 may be formed with one or some combination of the following: Fibre Channel (FC) interconnects, Small Computer System Interface (SCSI) interconnects, Internet Small Computer System Interface (iSCSI) interconnects, serial attached SCSI (SAS) interconnects, or other types of interconnects.

In general, in accordance with example implementations, a given storage segment 150 may contain one or multiple storage devices 154, which provides associated storage space, or segment, for the associated node 120. Moreover, in general, the primary node 120-1 and primary commit coordinator 130-1 serve as participants, for one or multiple file operation transactions.

In distributed file transactions, there are local transactions, which have no parents or children nodes and distributed transactions, which have one or more network transaction handles with these optimizing states: false and true parent, false, true and orphaned child (isolated early state transactions that will get aborted). These network transaction handles allow for carving a directed graph out of an acyclic transmission graph for the transaction: the first touch of a transaction establishes the true relationship, and later touches from other vectors share the transaction without any commit messaging guarantees. This optimization limits the size of message rounds.

A commit coordinator that takes part in the transaction is called a "participant" herein. After the file system client 102 that is coupled to the distributed file system 106 via network fabric 104, for example) begins a transaction to modify in a transactional manner protected file system state during its active phase, the fault tolerance strategy for primary participants protecting that state during commit processing is to checkpoint (to create corresponding checkpoints 132 in the backup nodes 120) each critical operation to the backup participant first, subsequently write to a journal 152 (which may or may not be shared and accessible to both the primary and backup participants), for purposes of checkpointing the persistence of that critical operation to the backup commit coordinator with a message, and then change the visible state being transaction protected under a lock for that modification (at least, or with an additional shared read lock). This is performed as the transaction moves around the network modifying state under the protection of different commit coordinators 130, thus building a distributed directed graph of transaction participants to be committed, until the file system client 102 decides to commit the completed set of transactional changes by notifying the parent commit coordinator 130 (the parent commit coordinator that is local to the application that began the transaction, for example.)

In accordance with example implementations, the process of committing the transaction begins at the originating parent primary commit coordinator 130 by the coordinator 130 checkpointing "preparing" to the parent backup coordinator 130 and doing any local flushing of system state to safe storage, which results in releasing any shared-read locks (the read optimization). Next, the primary commit coordinator 130 sends a "preparing" request in parallel to all the parent's children, which causes the children to checkpoint "preparing" to their backup coordinators 130 and flush their system states (releasing any shared-read locks), and then prepare their children and so on. This process continues until every participant (from the bottom of the transaction graph up), writes "prepared" to its journal 132, checkpoints "prepared" to its backup and then replies "prepared" to the "prepare" request from the parent going back up the transaction tree from the bottom, resulting in a fully prepared transaction subtree beneath the originating commit coordinator with exclusive update locks still held throughout the tree (waiting for the commit/abort decision.)

If any participant replies with an abort message during the preparing phase, or is ignorant of the transaction (presumed to be an abort), then that abort is transmitted to the network of participants, such that this transmission does not have to be fault tolerant due to presumed abort: if a parent node is contacted for the commit/abort decision and does not know about the transaction, then the transaction was aborted. After the subtree is prepared under the parent, the parent decides whether or not to abort: and the parent decides whether to commit.

If the transaction is not aborting after all the originating commit coordinator's children have replied "prepared," then the commit is completed by the originating primary parent commit coordinator checkpointing "committing" to the parent backup, writing "committed" to the parent journal, checkpointing "committed" to the parent backup and in parallel performing a lock release; and then sending "commit" to the children. The children then checkpoint "committing" to their backup; write "committed" to their journal and in parallel do a lock release and send "commit" to their children; and so on until every participant has checkpointed "committed" to their backup, replied "committed" to their parent and performed a lock release. Then, the transactions become durably "forgotten," resulting in a fully committed transaction network with all locks released and transactions that are "forgotten" everywhere, except in the journal transaction history.

In accordance with example implementations, the critical guarantees are as follows: 1.) parents remember "committed" until all of their "prepared" children are "committed", through any failure and restart; and 2.) children remember "prepared" and hold locks while "prepared" until they are told whether to commit or abort, through any failure and restart. Another invariant is that participants writing "prepared" to their journals have parents, and participants writing "committed" to their journals have children.

Figure 2A:
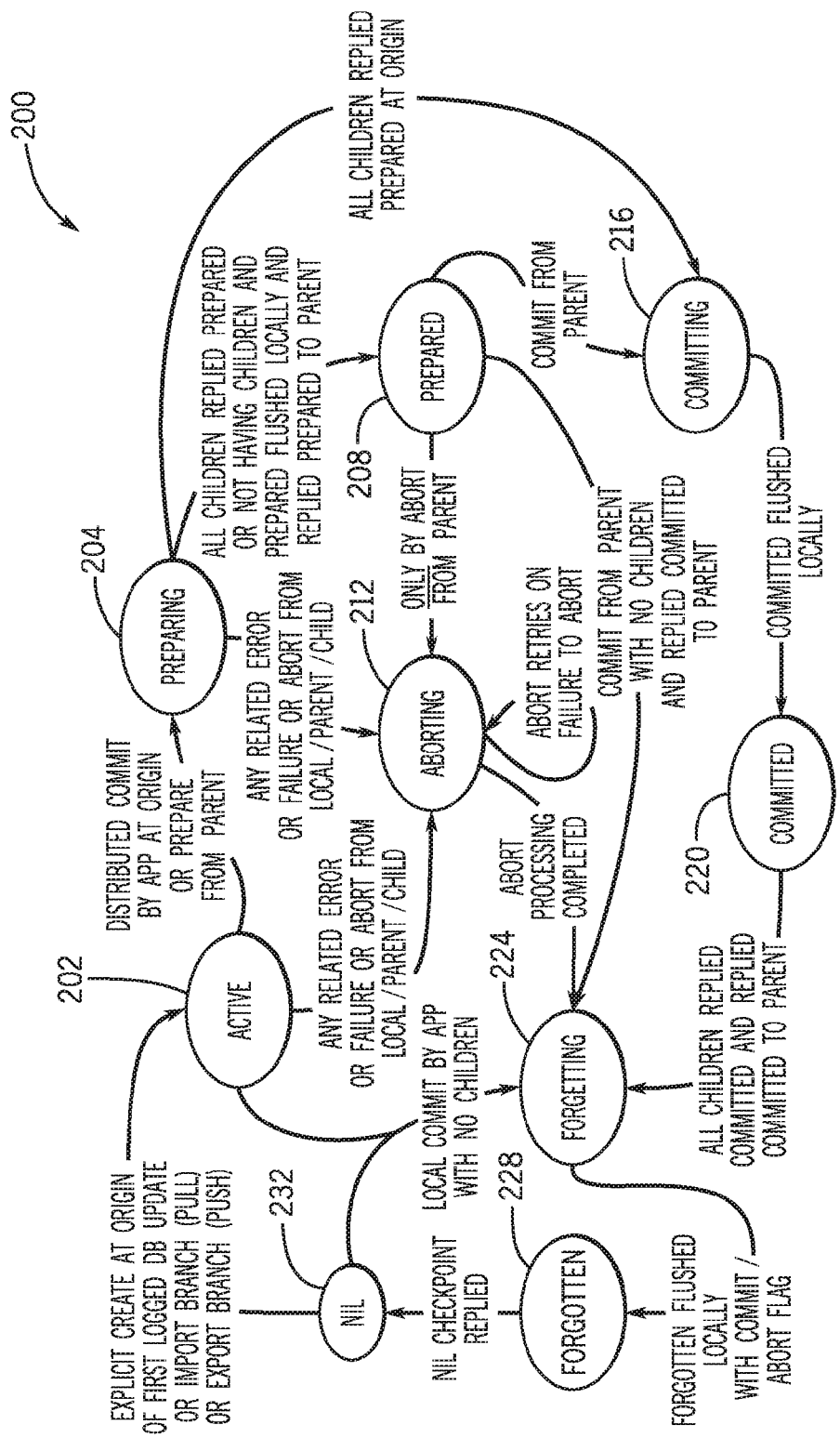
FIG. 2A is a state diagram depicting generalized three phase commit coordinator transaction states and transitions among the states according to an example implementation.

FIG. 2A is a state diagram 200 illustrating generalized three phase commit coordinator transaction states and transitions according to an example implementation. Referring to FIG. 2A, the three phase commit begins in an active state 202. The distributed commit begins due to initiation by an application at the origin or a prepare message from the parent, and either case causes a transition to a preparing state 204. Transition then occurs to a prepared state 208 upon all children replying "prepared," or if there are no children. From the preparing state 204, transition is made to an aborting state 212 upon any related error or a failure or abort from a local/parent/job. In the prepared state 208, an abort occurs only from a parent, in accordance with example implementations. If there are no aborts, a transition from the preparing state 208 to the committing state (this occurs only at the originating parent node, because only children can go prepared) 216 occurs due to all children replying "prepared" at the origin. For the children, transition from the prepared state 208 occurs to a committing state 216 due to a commit from a parent or swiftly through committing to the committed state 220 with a flush and a quick reply, due to a commit from a parent when the child has no children. A transition occurs between the committing state 216 and a committed state 220 when the committed is flushed locally. A transition occurs to the forgetting state 224 upon all children replying "committed". Moreover, a transition to the forgetting state 224 occurs from the prepared state 208 upon a commit from a parent with no children. A transition to the forgetting state 224 may also occur from the aborting state 212 upon an abort processing being completed. From the forgetting state 224, a transition is made to the forgotten state 228 when the forgotten are flushed locally. From the forgotten state 228, a nil checkpoint is replied to transition to a nil state 232. As depicted in FIG. 2A, transition from a nil state 232 from the active state 202 back to the forgetting state 224 may occur when a local commit occurs by a purely local application with no children.

Figure 2B:
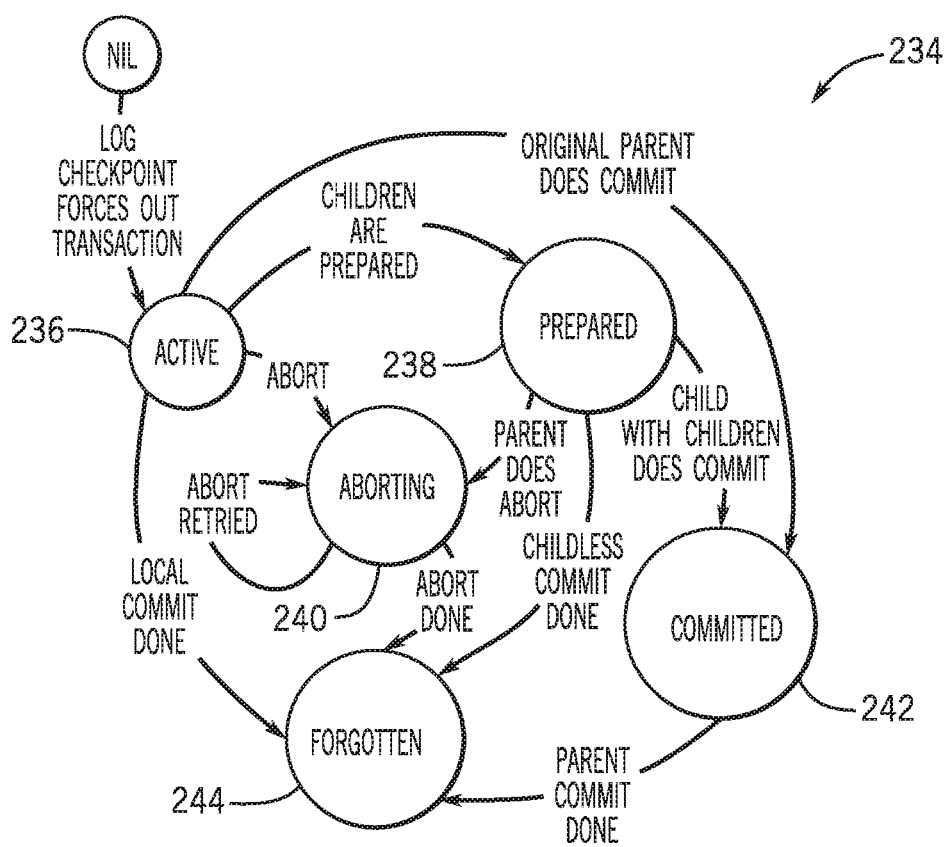
FIG. 2B is a state diagram depicting generalized three phase commit log transaction states and transitions among the states according to an example implementation.

Referring to FIG. 2B, for the corresponding state diagram 234 illustrating the transaction states that are present in the log, the logging for a transaction can begin in an active state 236 if a log checkpoint forces out a transaction, otherwise that active state might not get logged. From the active state 236, a transition may occur to a committed state 242 in response to an original parent performing a commit. A transition may occur from the active state 236 to a prepared state 238 due to all children being prepared. Moreover, a transition may be made between the active state 236 and a forgotten state 244 in response to a local commit being performed. An abort may occur, thereby transitioning from the active state 236 to an aborting state 240.

In the prepared state 238, a transition occurs to the aborting state 240 if the parent does the abort. A transition occurs between the prepared state 238 and the committed 242 in response to a child with no children performing a commit. A transition occurs between the prepared state 238 and a forgotten state 244 in response to a childless commit being performed. A transition occurs between the committed state 242 and the forgotten state 244 in response to a parent performing a commit.

Figure 2C:
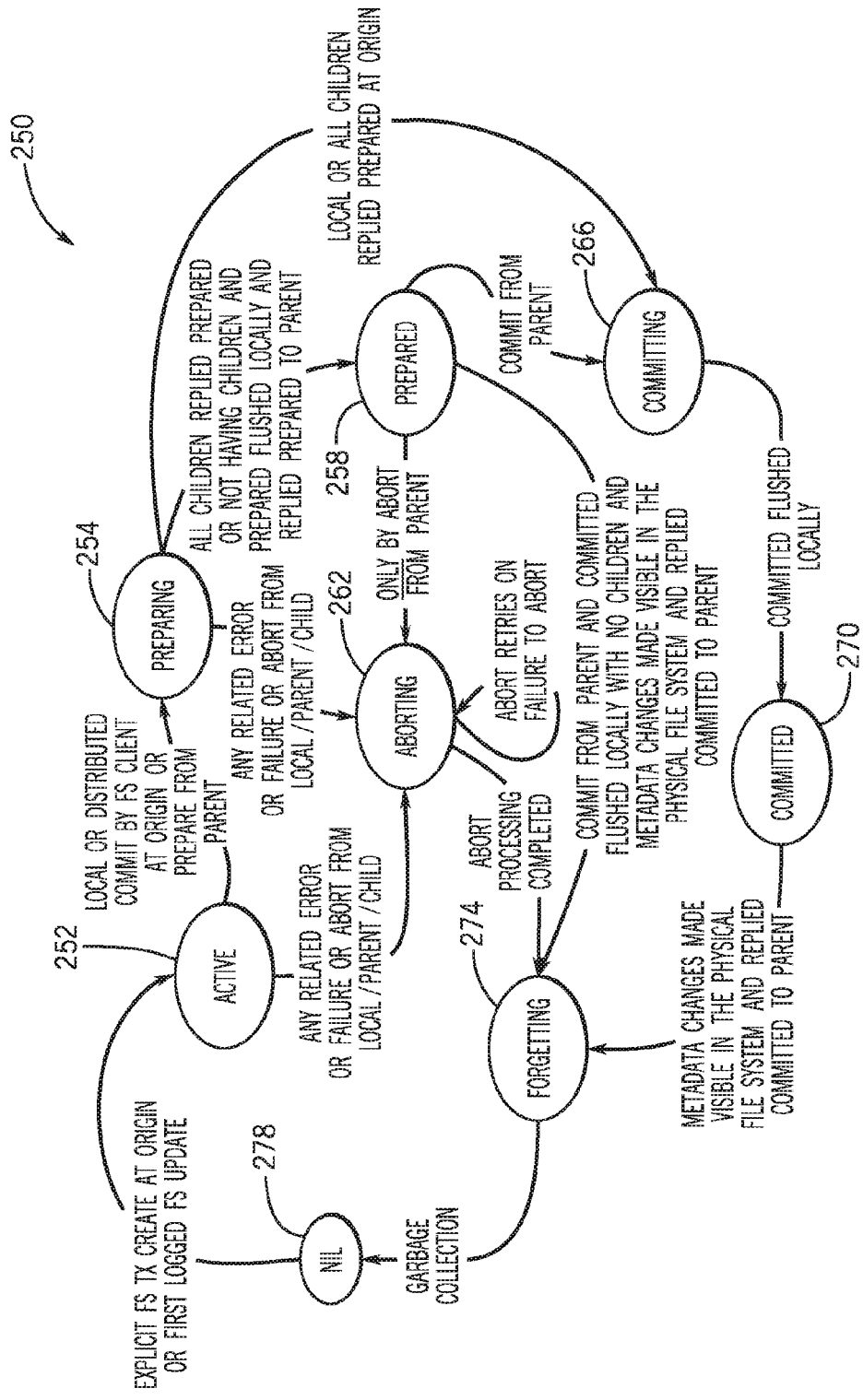
FIG. 2C is a state diagram depicting three phase commit coordinator transaction states for a distributed file system and transitions among the states according to an example implementation.

Referring to FIG. 2C, regarding a state diagram 250 for a three phase commit for a distributed file system, the three phase commit begins in an active state 252. A local or distributing commit by a file system client at the origin or a prepare message from a parent causes a transition to a preparing state 254. The preparing state 254 may transition to an aborting state 262 due to any related error or failure or abort from a local/parent/child. From the preparing state 254, a transition occurs to the prepared state 258 in response to all children replying prepared or not having children. From the prepared state 258 an abort may occur to the aborting state 262 only due to an abort from a parent. From the prepared state 258, a transition occurs to a committing state 266 due to a commit from a parent. Moreover, a transition occurs from the prepared state 258 to a forgetting state 274 due a commit from a parent with no children. A transition occurs from the committing state 266 to a committed state 270 in response to a committed transaction being flushed locally. A transition occurs from the committed state to the forgetting state 274 in response to the metadata changes being made visible on the physical file system and "committed" being replied to the parent. Moreover, as depicted in FIG. 2C, a transition occurs between the aborting state 262 and the forgetting state 274 in response to abort processing being completed. As also shown in FIG. 2C, a transition occurs between the forgetting state 274 and the nil state 278 due to garbage collection.

Figure 2D:
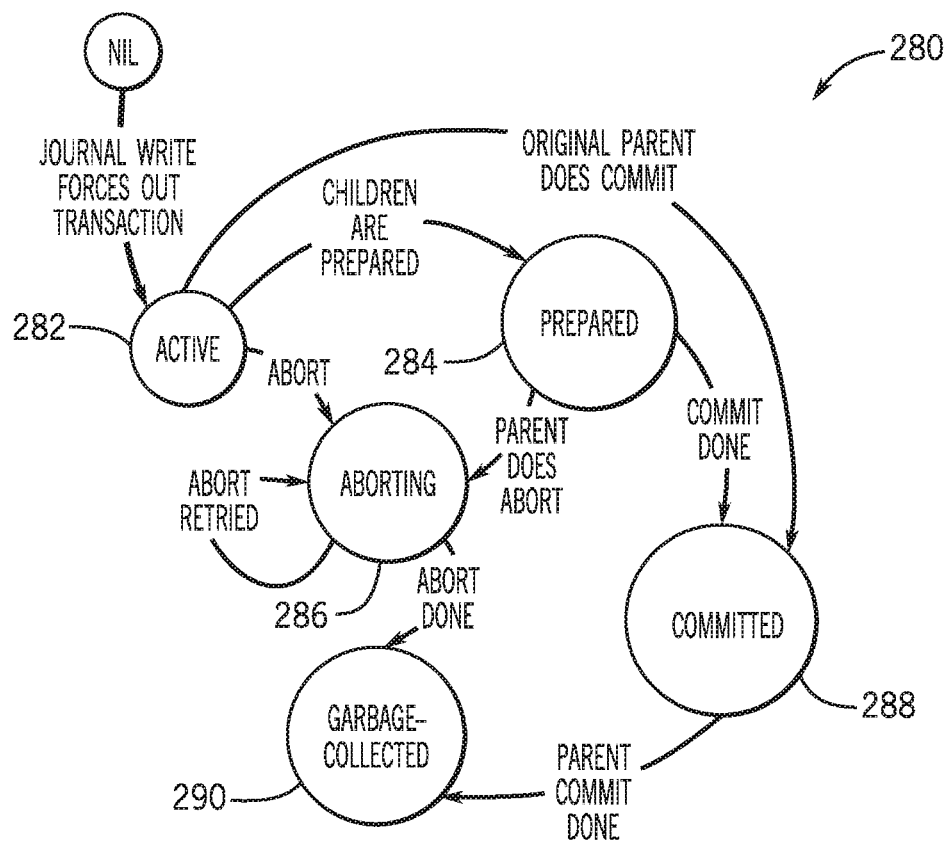
FIG. 2D is a state diagram depicting three phase commit log transaction states for a distributed file system and transitions among the states according to an example implementation.

Referring to FIG. 2D, which depicts a state diagram 280 for the corresponding transaction states that are present in the log, the logging for a transaction can begin in an active state 282 if a log checkpoint forces out a transaction, otherwise that active state might not get logged. An abort from the active state 282 transitions to an aborting state 286. If all children are prepared, then a transition occurs between the active state 282 and a prepared state 284. In response to the original parent performing a commit, a transition occurs between the active state 282 and a committed state 288. Moreover, a transition occurs between the prepared state 284 and a committed state 288 in response to a commit being performed. A transition occurs between the committed state 288 and a garbage-collected state 290 in response to the parent performing a commit. As depicted in FIG. 2D, in response to an abort being performed, a transition occurs between the aborting state 286 and the garbage-collected state 290.

Referring back to FIG. 1, the failure of any primary commit coordinator 130 results in a transparent takeover by the backup commit coordinator 130, who traverses the list of transactions as follows: 1.) "active" transactions get no action; 2.) "aborting" transactions may continue to abort unless there is lost undo from the failure, in which case they are aborted again, 3.) "preparing" transactions are flushed (possibly again) and their children get prepared (possibly again, which may result in an abort if the session loss between them was not transparently masked in the takeover); 4.) "prepared" transactions write a (possibly extra) "prepared" record to the journal 152 (if the journal 152 is shared) and then reply "prepared" to seek commit/abort knowledge from their parents; 5.) "committing" transactions write a (possibly extra) "committed" record to the journal 152 (if the journal 152 is shared), and then commit all of their children again; 6.) "committed" transactions commit all of their children again (in case of communication errors), and 7.) "forgetting" transactions reply committed again to the parent, unless the current node is the parent.

In accordance with example implementations, a double failure of any commit coordinator pair (such as the failure of the new primary coordinator 130 during the backup repair window from a previous failure) results in a crash recovery from the journal transaction history and is handled as in a two phase commit, according to the final transaction state record for every transaction as follows: 1.) "active" transactions at the time of the crash are aborted; 2.) "aborting" transactions are aborted again; 3.) "prepared" transactions seek commit/abort knowledge from their parents under the rule of presumed abort; 4.) "committed" transactions check to see if the transaction changes were made visible in the distributed file system and complete or repair it if necessary, and then send committed to all of their children again; and 5.) "forgotten" transactions (records marked for garbage collection) are ignored.

Figure 3:
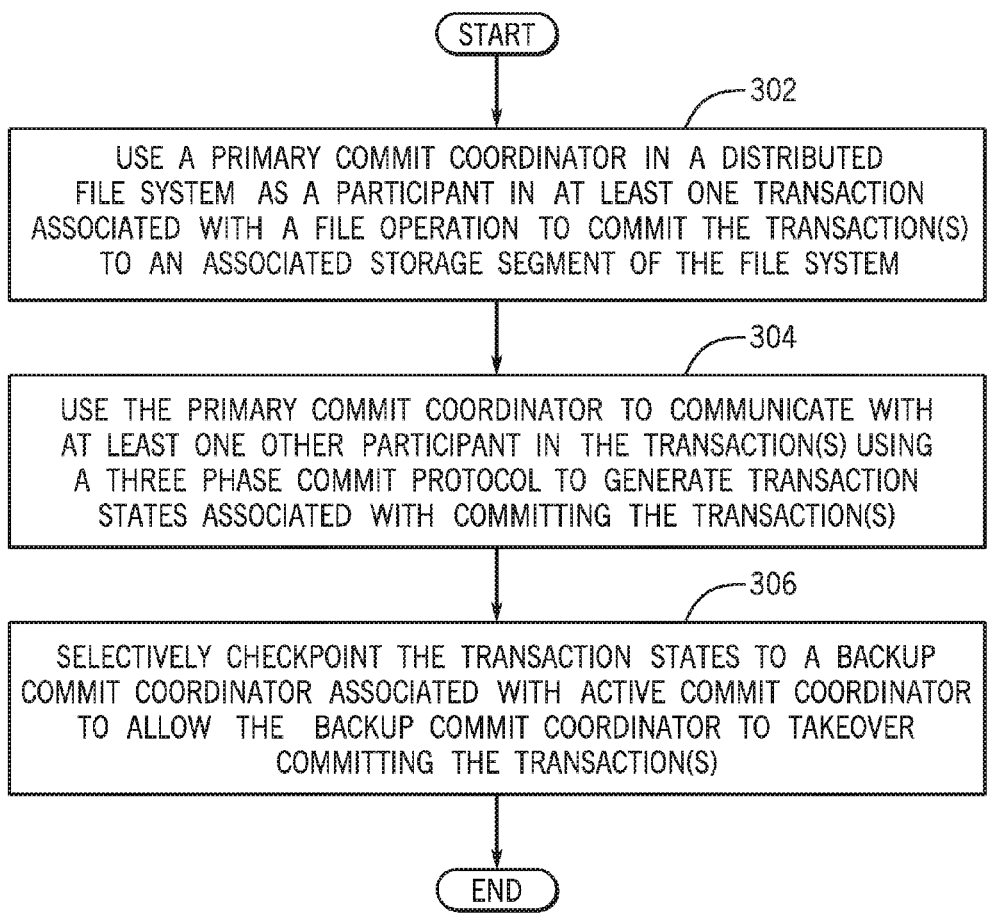
FIG. 3 is a flow diagram depicting a technique to use a three phase commit protocol to commit file operation transactions according to an example implementation.

Thus, referring to FIG. 3 in conjunction with FIG. 1, in accordance with example implementations, a technique 300 includes using (block 302) a primary commit coordinator in a distributed file system as a participant in at least one transaction that is associated with a file operation to commit the transaction(s) to an associated storage segment of the file system. The primary commit coordinator is further used (block 304) to communicate with at least one other participant in the transaction(s) using a three phase commit protocol to generate transaction states that are associated with committing the transaction(s). Pursuant to the technique 300, the transaction states are selectively checkpointed (block 306) to a backup commit coordinator that is associated with the primary commit coordinator to allow the backup commit coordinator to takeover committing the transaction(s).

Referring back to FIG. 1, in accordance with further example implementations, the backup commit coordinator 130 may reside on an entirely different couplet 110 than the couplet 110 that contains the primary commit coordinator 130. For these implementations, the backup commit coordinator 130 does not have access to the previous primary commit coordinator's segment server storage after takeover from the primary commit coordinator 130 to continue the commit protocol. However, the backup commit coordinator 130 is still available to provide previous outcomes of commit and abort for distributed transactions to any prepared children, thereby allowing them to complete the distributed transactions involved and free their locked state on the child node and its children. This provides for non-blocking distributed commit transactional answers from the former backup (now primary) commit coordinator, using previously checkpointed transaction state, while recovery proceeds on the former, primary commit coordinator node possessing the segment server storage for the file system.

The taking-over, new primary commit coordinator may drive aborts of active transactions (under the presumed abort protocol) that may have timed out quickly freeing locks elsewhere in the distributed file system, if the entire couplet containing the file system state is taking too long to become available. Transaction timeouts can most effectively be applied in the originating primary parent node for the transaction or in its backup commit coordinator, and not in child branches of the transaction that have become part of the transaction after an arbitrary time has passed since its birth. To reiterate the invariants, in accordance with example implementations, originating parents that have not durably committed may initiate the abort of "prepared" transactions; but any node may abort "active" or "preparing" transactions, with the exception of the taking over backup node for an active participant, which is not capable of knowing whether the primary has written a "prepared" record to the journal 152 (or not) for a "preparing" transaction before the primary failed.

In accordance with some example implementations, a technique for three phase commit for a distributed file system on segment servers performs the two phases of prepare and commit of the file metadata with checkpoints between the primary and backup commit coordinators. This allows for a transparent fault tolerant takeover in the case where one of the primary coordinators has a failure in the middle of the commit protocol and renders the commit as non-blocking across anything but a double failure of the participating primary and backup commit coordinators.

In the following example implementation, single operation transactions for distributed file systems are limited to two nodes for a file create (new file dentry and inode+file on two different segment servers) and four nodes for a file rename (old file dentry and inode+file, and new node dentry and inode+file on four different segment servers), such that larger operations (wildcarding, etc.) are broken up into single file operation transactions and are not atomic. Due to the limited scope of single operation transactions, the client doing these transactions is aware of all the participants, and therefore, the transaction tree is limited to one parent with up to four children and no grandchildren. Example file operations are described below.

Figure 4:
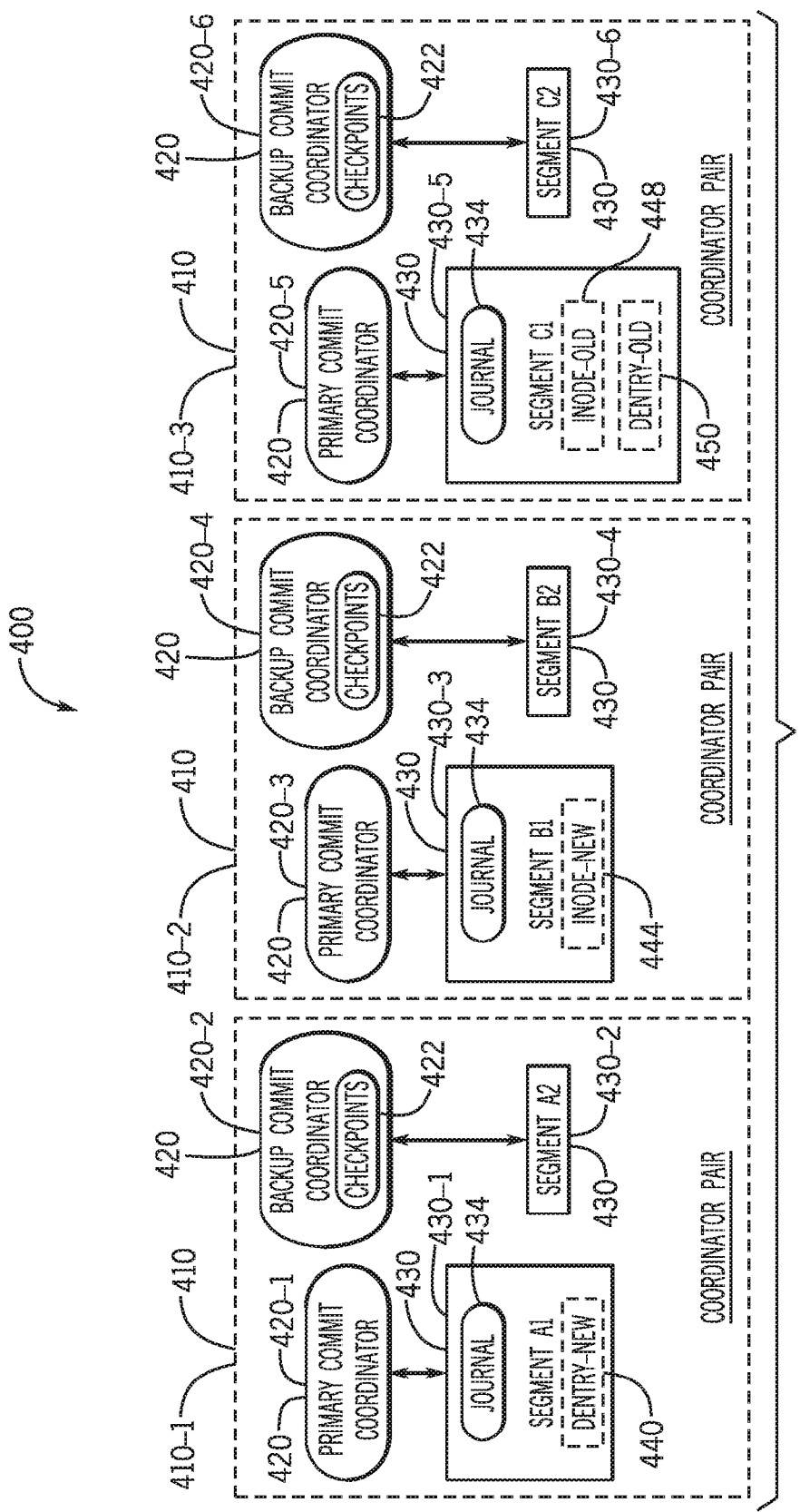
FIG. 4 is an illustration of components involved in a rename file operation according to an example implementation.

FIG. 4 is an illustration 400 of storage segments 430 and associated commit coordinators 420 involved in a single file operation. For this example, the single file operation is an operation to rename a file and involves three commit coordinator "couplets," or pairs 410 (coordinator pairs 410-1, 410-2 and 410-3) of storage nodes. In general, each coordinator pair 410 includes a primary commit coordinator 420 that has an associated segment 430 and a backup commit coordinator 420 that has associated storage segment 430-2. Each commit coordinator may reside on a physical storage node, in accordance with example implementations.

As depicted in FIG. 4, for this example, the coordinator pair 410-1 contains the primary commit coordinator 420-1 and the backup commit coordinator 420-2; the coordinator pair 410-2 contains the primary commit coordinator 420-3 and the backup commit coordinator 420-4; and the coordinator pair 410-3 contains the primary commit coordinator 420-5 and backup commit coordinator 420-6. Moreover, in the following discussion, the storage segment 430-1 is used by the primary commit coordinator 420-1 and is referred to as "Segment A1"; the storage segment 430-2 is used by the backup commit coordinator 420-2 and is referred to as "Segment A2"; the storage segment 430-3 is used by the primary commit coordinator 420-3 and is referred to as "Segment B1"; the storage segment 430-4 is used by the backup commit coordinator 420-4 and is referred to as "Segment B2"; the storage segment 430-5 is used by the primary commit coordinator 420-5 and is referred to as "Segment C1"; and the storage segment 430-6 is used by the backup commit coordinator 420-6 and is referred to as "Segment C2."

For this example, Segment A1 hosts the dentry 440 for the newly created file (renamed "to") for the primary commit coordinator 420-1. Segment B1 hosts the inode 444 for the newly created file for the primary commit coordinator 420-3. Segment C1 hosts the old inode 448 and the old dentry 450 for the file that was moved (renamed "from") for the primary commit coordinator 420-5.

For the following example, a transaction identification (ID) A1:57 is used, which denotes that the operation began on Segment A1, local ID=57, where the dentry 440 for the newly created file is hosted.

Each Segment A1, B1 or C1 that is associated with a primary commit coordinator has a local journal 434 in addition to the physical file system where inodes and dentrys are visible. Moreover, in accordance with example implementations, each of the Segments A2, B2 and C2, which is associated with a backup commit coordinator has a local journal 434 as well but no copy of the physical file system.

In accordance with example implementations, a distributed file system client performs the protocol for renaming a file. The client first creates the new file by visiting the node for Segment B1 and requests an inode that is also created by a checkpoint to the node for Segment B2. The client then visits the node for Segment A1 and requests a dentry that is also created by a checkpoint to the node for Segment A2. The client then visits the node for Segment C1 and asks to remove the old inode and dentry and that removal is checkpointed to the backup commit coordinator for Segment C2.

After logically connecting the inode and the dentry and removing the old ones, the client writes records of the entire metadata state of the distributed transaction A1:57 to the nodes for all three primary Segments A1, B1 and C1 in memory transaction states, which are checkpointed to the nodes for Segments A2, B2 and C2 as well. When the operation succeeds for all three primary and backup nodes, the client returns success. This leaves the operation capable of being rolled back at this point because there is no durable state has yet been written to a safe store.

The nodes for primary segments A1, B1 and C1 each have an associated flush timer. When the timer expires (about every 10 seconds, for example), the node wants to flush its outstanding in-memory transactions to disk. When the flush timer expiration is associated with the node for either Segment B1 or C1 (not transaction beginners), this initiates running of the three phase commit for the set of transactions in its flush buffer (just A1:57 in this example, which gets flushed as a primary transaction). For transaction A1:57, the node for either one or both of the non-parent B1 or C1 may send a message to the node for Segment A1 to ask for a three phase commit to be run.

In further example implementations, the non-parent node (parent node for Segment B1 or C1, for example) waits for one or two flush timeouts before asking to run a three phase commit for purposes of reducing network traffic.

The primary commit coordinator 420 for Segment A1 initiates the three phase commit as parent for the set of transactions in its flush buffer (the transaction A1:57 in this example). The primary commit coordinator 420 for Segment A1 is the commit coordinator for A1:57 because Segment A1 owns the new dentry, although the backup commit coordinator 420 for Segment A2 may also be the parent in the case that the primary commit coordinator is down (the commit protocol needs to know precisely beforehand the commit coordinator pairs that are authorized parents for any file system operations).

In accordance with example implementations, the three phase commit proceeds as follows. After checkpointing "preparing" to backup Segment A2, the commit coordinator for Segment A1 sends prepare messages to all primary children participants (the primary coordinators 420 for Segments B1 and C1). After the commit coordinators 420 for B1 and C1 checkpoint "preparing" (in parallel) to the backup commit coordinators for Segments B2 and C2 all of the commit coordinators in A1:57's transaction graph (network) are in the "preparing" state.

Whereas preparing and committing the transaction subtree is processed in a top down fashion, the transaction subtree is processed in a bottom up fashion for the prepared phase. After any of the leaf or childless participants (children B1 and C1) are in the "preparing" state, the participant may write out all complete journal entries, separately and in parallel, together with the "prepared" state for transaction A1:57. The commit coordinators for Segments A1, B1 and C1 flush their journal entries for A1:57 to disk in this example. This makes for one disk input/output (I/O) operation for all the transactions in the flush buffer (i.e., a group commit flush) on each of the three primary coordinators participating in the A1:57 transaction, for all of the transactions currently being flushed.

After the journal I/O writing the "prepared" state and journal metadata entries completes separately and in parallel for the commit coordinators for primary segments B1 and C1, then "prepared" is checkpointed to the commit coordinators for backup Segments B2 and C2 (in parallel, correspondingly) and then "prepared" is replied by each child to the commit coordinator for primary Segment A1. After the journal I/O writing the subtree state and journal metadata entries completes on the commit coordinator for primary Segment A1 and having received the "prepared" reply from the children on the commit coordinators for primary Segments B1 and C1, the entire transaction A1:57 subtree under Segment A1 (a small directed graph) is in the "prepared" state.

When the original parent coordinator of transaction A1:57 (i.e., the primary coordinator for Segment A1) has received all of the "prepared" messages from its children, the coordinator commits transaction A1:57 by first checkpointing "committing" to the commit coordinator for backup segment A2 and then flushing its journal entries to disk with transaction A1:57 in the "committed" state. The originating parent journal 434 is the ultimate durable repository for the commit/abort decision for the entire commit tree for the transaction A1:57. After checkpointing "committed" to the backup commit coordinator for Segment A2 (the eponymous three phase commit), the parent coordinator for Segment A1 sends (in parallel) "committed" messages to its children and to the commit coordinators for Segments B1 and C1. The primary commit coordinators for primary Segments B1 and C1, upon receiving "committed" from its parent, then commits transaction A1:57 by first checkpointing "committing" to the backup commit coordinators for Segments B2 and C2 (in parallel, correspondingly); and the primary commit coordinators then flush (in parallel) their journal entries to disk with transaction A1:57 in the "committed" state and checkpoint "committed" to the backup commit coordinators for segments B2 and C2 in parallel.

In accordance with example implementations, the file system is kept in a consistent state, according to the metadata and a specific set of guarantees regarding visibility of the changes in progress. To accomplish that, one of several mechanisms can be used: 1. An optimistic mechanism that exposes metadata state changes once they have been executed but remain in-memory before the three phase commit protocol has been run, but after all parts of the metadata state change have been completed on all participants. This is the expected default for performance reasons, and using it implies that in the presence of a catastrophic failure, that file system operations that are visible (i.e. that have appeared to have completed successfully) will be rolled back visibly to the user. 2. A somewhat pessimistic mechanism whereby a file system operation blocks while a transaction that is not "wholly" committed is pushed to the commit state on all participants. This would be akin to a "synchronous" operation in a local file system where the operation is blocked until the I/O for the operation has completed. 3. A very pessimistic mechanism, whereby no participant may make metadata changes visible until ALL participants have durably committed their transactions, (even though they are batched and wait for a flush timer to be initiated). This seems overly pessimistic mechanism for today's disk hardware and the 10 second batch commit flush timer, but it could become important if I/O becomes inexpensive and the flush timer is reduced to the expected time for a single I/O to complete. The second and somewhat pessimistic mechanism is described in the following examples.

The moment that any participant has durably "committed" its transaction (having written "committed" into that segment's journal), the participant is then free to write the committed transaction out (make the metadata changes visible) to the physical file system on its segment server, and each is free as well to mark the transaction record for garbage collection in their corresponding segment server journal. This may be done asynchronously and/or by observing a second longer timeout and flushing all committed transactions at that point, depending on the particular implementation. Segment A1 writes out and makes visible the new dentry to the physical file system; Segment B1 writes out and makes visible the new inode; and Segment C1 removes and makes invisible the old dentry and old inode.

After the journal I/O completes for Segments B1 and C1 and the changes have been made visible in their physical file system states, the following operations occur. First, "committed" is replied to the parent primary Segment A1 and then "forgetting" is checkpointed to the commit coordinators for backup Segments B2 and C2 (in parallel). After the disk I/O completes for primary Segment A1, the changes have been made visible. Having received the "committed" reply from the children on the commit coordinators for primary segment servers B1 and C1, "forgetting" is checkpointed to the backup commit coordinator for Segment A2. At this point, the entire transaction A1:57 network (directed graph) is in garbage collection, and that transaction network is flushed to disk the next time the flush timer expires in the separate Segment servers.

To summarize, the network (directed graph) journal order is as follows: "prepared" is written in bottom-up order (first C1 or B1, then A1); "committed" is written in top-down order (first A1, then B1 or C1). The metadata may be made visible in parallel after the "committed" state is durable on any branch. However, these metadata and physical file system changes may be made concurrently to the commit process if the changes may be rolled back deterministically, in accordance with further example implementations.

A failure of any primary commit coordinator for a segment server results in a transparent takeover by the backup commit coordinator, who goes down the list of transactions and their last checkpointed state as follows: 1.) "active" transactions get no action; 2.) "aborting" transactions may continue to abort unless there is "lost undo" (undo not applied properly) from the failure of the process of aborting, in which case they are aborted again; 3.) "preparing" transactions are flushed (possibly again) and their children get prepared (possibly again, which may result in an abort if the session loss between them was not transparently masked in the takeover); 4.) "prepared" transactions write a (possibly extra) "prepared" record to the journal then reply "prepared" to seek commit/abort knowledge from their parent; 5.) "committing" transactions write a (possibly extra) "committed" record to the journal, then check to see if the changes were made visible in the distributed file system and complete or repair it if necessary, and then commit all of their children again; 6.) "committed" transactions commit all of their children again; and 7.) "forgetting" transactions reply "committed" again to the parent segment server, unless the current node is the original parent.

A double failure of any commit coordinator pair for a segment server (typically the failure of the new primary coordinator during the backup repair window from a previous failure) results in a crash recovery from the journal transaction history and is handled similarly to crashes in two phase commit, according to the final historic transaction state for every transaction: 1.) "active" transactions at the time of the crash are aborted and send aborts to any parents and children; 2.) "aborting" transactions get aborted again; 3.) "prepared" transactions seek commit/abort knowledge from their parents; 4.) "committed" transactions check to see if the transaction changes were made visible in the distributed file system and complete or repair it if necessary, and then send committed to all of their children again; and 5.) "forgotten" transactions (records marked for garbage collection) are ignored.

In accordance with example implementations, a technique for three phase commit for a distributed file system on segment servers performs the two phases of prepare and commit of the file metadata, with no limits or with arbitrary limits on the size of the metadata involved in the transactions (allowing atomic commit of wildcard operations, etc.), with checkpoints between the primary and backup commit coordinators, allowing for a transparently fault tolerant takeover in the case where one of the primary coordinators has a failure in the middle of the commit protocol. This renders the commit as non-blocking across anything but a double failure of the participating primary and backup commit coordinators.

For these example implementations, transactions for distributed file systems are not limited to any number of children, and large operations (wildcarding) are not broken up into single file operation transactions. Furthermore, the client initiating these transactions is not necessarily aware of who all the participants are and there would not necessarily be a single parent with some limited number of children and no grandchildren. It is noted that there is no centralized coordination of the entire metadata map for the transaction, in accordance with example implementations, which makes this approach scalable for large and complex transactions. The modifications for file system visibility, and network and fault-handling optimizations are described in the following example.

Figure 5:
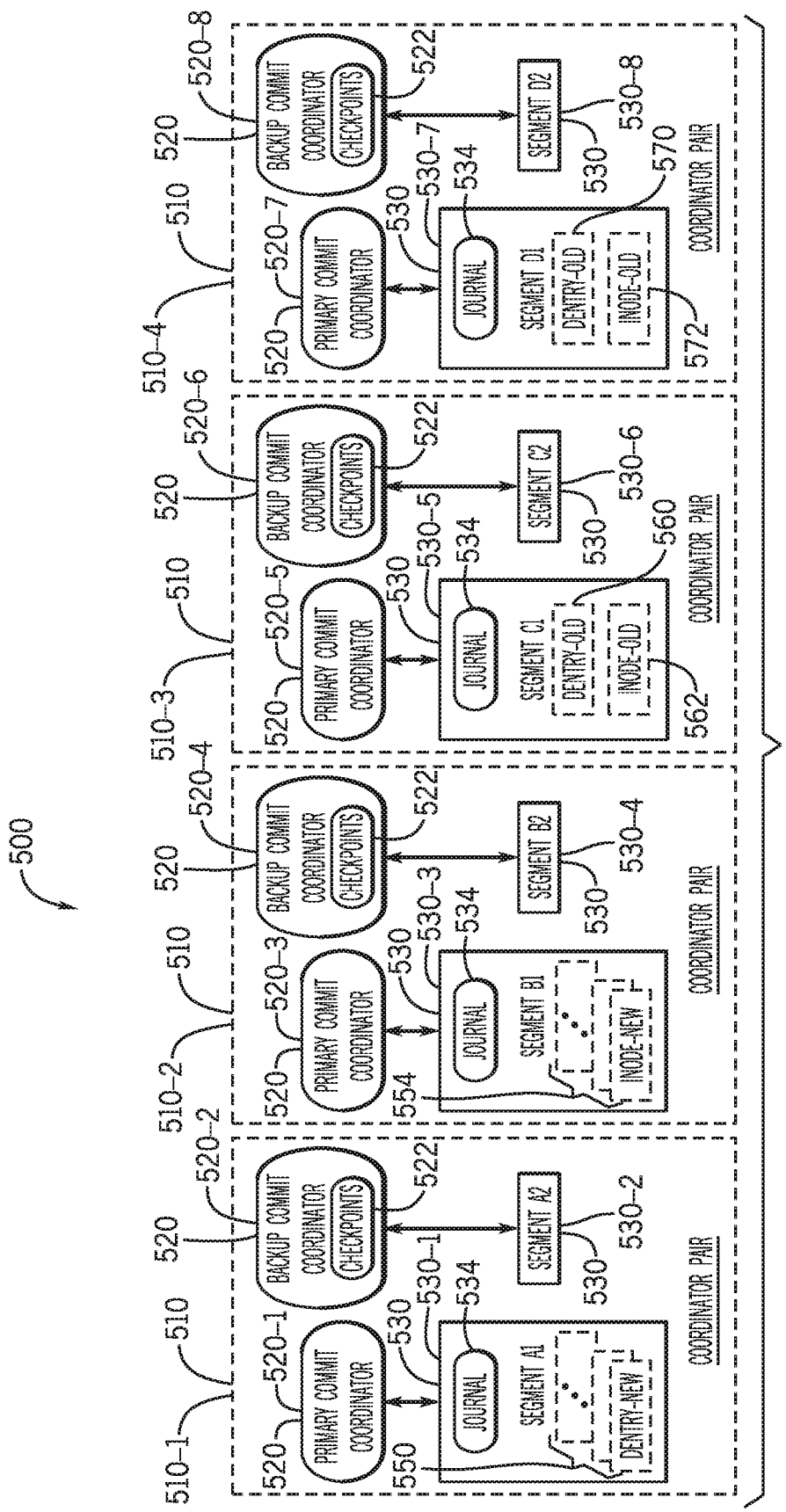
FIG. 5 is an illustration of components involved in a sequence of related file operations according to an example implementation.

FIG. 5 is an illustration 500 of "couplets," or coordinator pairs 510 (coordinator pairs 510-1, 510-2, 510-3 and 510-4), used for a related sequence of multiple file operations. For this example, each coordinator pair 510 contains an primary commit coordinator 520 and a backup commit coordinator 520: the coordinator pairs 510-1, 510-2, 510-3 and 510-4 contain a primary commit coordinator 520-1 and a backup commit coordinator 520-2; a primary commit coordinator 520-3 and a backup commit coordinator 520-4; a primary commit coordinator 520-5 and a backup commit coordinator 520-6; and a primary commit coordinator 520-7 and a backup commit coordinator 520-8, respectively. Moreover, the coordinators pairs 510-1, 510-2, 510-3 and 510-4 use the Segments A, B, C and D, with a similar notation to the example depicted in connection with FIG. 4.

An example non-local move (rename) of two files is used to illustrate the method. For this example, Segment A1 hosts the dentries 550 for the newly created files (renamed "to") and has an associated primary commit coordinator 520-1. Backup commit coordinator 520-2 is associated with Segment A2. Segment B1 hosts the inodes 554 for the newly-created files (renamed "to") for the primary commit coordinator 520-3 with its backup commit coordinator 520-4 being assigned to Segment B2. Segment C1 hosts the old inode 562 and the old dentry 560 for the first file that was moved (renamed "from") for the primary commit coordinator 520-5 with its backup commit coordinator 520-6 using Segment C2. Segment D1 hosts the old inode 572 and old dentry 570 for the second file that was moved (renamed "from") for the primary commit coordinator 520-7 with its backup commit coordinator 520-8 using Segment D2. The transaction ID is A1:92, which denotes that the transaction began on Segment A1, local ID=92, where the dentrys 550 for both of the newly created files are hosted.

Each segment (A1, B1, C1 and D1) with a primary commit coordinator has a local journal in addition to the physical file system where inodes and dentries are visible. Each segment (A2, B2, C2 and D2) with a backup commit coordinator has a local journal as well.

For this example, a client performs the protocol for creating a new file. The client first visits the node for Segment B1 and asks for two inodes that are also created by a checkpoint to the node for Segment B2. The client next visits Segment A1 and asks for two dentrys that are also created by a checkpoint to the backup node for Segment A2; then the client visits the node for Segment C1 and asks to remove the first old inode and dentry that is also removed by a checkpoint to the backup node for Segment C2. The client visits the node for Segment D1 and asks to remove the second old inode and dentry that is also removed by a checkpoint to the node for Segment D2.

After logically connecting the inodes and the dentries and removing the old ones, the client writes records of the entire metadata state of the distributed transaction A1:92 to all four primary nodes, and this data is checkpointed to the associated backup nodes. When the operation succeeds for all four primary nodes and all four backup nodes, the client returns success. This leaves the operation capable of being rolled back because no durable state has yet been written to a safe store.

For multiple file operation transactions, children can also be parents, grandparents and so on. In this example, the origination of the transaction is at the node for Segment A1; and the child node for Segment B1 is the transaction parent for the nodes for Segments C1 and D1, who are grandchildren in the transaction without the node for Segment A1 having any commit knowledge of their participation as children of Segment B1.

The primary nodes for A1, B1, C1 or D1 have associated flush timers, and expirations of these timers (at ten second intervals, for example) prompt the nodes to want to flush the outstanding in-memory transactions to disk. When the flush timer expiration is from the node for child Segment B1, or grandchildren Segment C1 or D1, then the node initiates three phase commit for the set of transactions in its flush buffer (just A1:92 in this example, which gets flushed as a primary transaction). For transaction A1:92, either the node for child Segment B1 sends a message to the node for parent Segment A1, or the node for grandchildren Segment C1 or D1 sends a message to the node for Segment B1 who then sends a message to the node for Segment A1, to ask for a three phase commit to be run. In accordance with further, example implementations, the non-parent node for Segments B1, C1 or D1 may wait one or two flush timeouts before asking for purposes of reducing network traffic.

The commit coordinator for Segment A1 initiates three phase commit as parent for the set of transactions in its flush buffer (just A1:92 in this example). The commit coordinator for Segment A1 is the commit coordinator for A1:92 because it is the segment owning the new dentries and the one that initiated the transaction, although the commit coordinator for Segment A2 may also be the parent in the case that the commit coordinator for Segment A1 is down. It is noted that the commit protocol knows beforehand the commit coordinator pairs that are authorized parents for any file system operations.

The three phase commit protocol proceeds for the example of multiple file operation transactions as follows, in accordance with example implementations. After checkpointing "Preparing" to the commit coordinator for Segment A2, the commit coordinator for Segment A1 sends prepare messages to all primary children participants (only child B1). After checkpointing "Preparing" to the commit coordinator for backup Segment B2, the commit coordinator for Segment B1 sends prepare messages to all primary children participants (grandchildren C1 and D1). After the commit coordinators for C1 and D1 checkpoint "Preparing" to the commit coordinators for backup grandchildren Segments C2 and D2 (in parallel, correspondingly) all commit coordinators in A1:92"s transaction graph (network) are in "Preparing" state (because there are no great-grandchildren).

While preparing and committing, the transaction subtree is processed in a top down fashion; but for going prepared, the transaction subtree is processed in a bottom up fashion. After any of the leaf or childless participants (grandchildren C1 and D1) are in the "preparing" state, the participant(s) may write out their complete journal entries, separately and in parallel, together with the "prepared" state for transaction A1:92. The commit coordinators for Segments C1 and D1 flush their journal entries for A1:92 to disk in this example. This makes for one disk I/O for all the transactions in the flush buffer (a group commit flush) on each of the leaf coordinators participating in A1:92, for all of the transactions currently being flushed.

After the journal I/O writing the "prepared" state and journal metadata entries completes separately and in parallel on the commit coordinators for grandchildren primary Segments C1 and D1 (and since there are no great-grandchildren), "prepared" is checkpointed to the backup Segments C2 and D2 (in parallel, correspondingly); and then "prepared" is replied by each child to their commit coordinator for parent primary Segment B1. Once the journal I/O completes on the commit coordinator for child primary Segment B1 and the children of B1 (C1 and D1) have replied "prepared", "prepared" is checkpointed to the commit coordinator for backup Segment B2 and then "prepared" is replied to the originating commit coordinator for parent primary segment A1. After the journal I/O writing the subtree state and journal metadata entries completes on the commit coordinator for primary Segment A1 and having received the "prepared" reply from the child on the commit coordinator for primary Segment B1, at that point the entire transaction A1:92 subtree under Segment A1 (a potentially large directed graph) is in "prepared" state.

When the original parent coordinator of transaction A1:92 for Segment A1 has received all of its "prepared" messages from its children, it then commits transaction A1:92 by first checkpointing "committing" to the backup commit coordinator for Segment A2, then flushing its journal entries to disk with transaction A1:92 in the "committed" state. The originating parent journal is the ultimate durable repository for the commit/abort decision for the entire commit tree. After checkpointing "committed" to the backup commit coordinator for Segment A2, the parent coordinator for Segment A1 sends "committed" messages to its children in parallel, which resolves to the commit coordinator for Segment B1. The commit coordinator for primary Segment B1, upon receiving "committed" from its parent then commits transaction A1:92 by checkpointing "committing" to the backup commit coordinator for Segment B2.

After checkpointing "committed" to the backup commit coordinator for Segment B2, the commit coordinator for Segment B1 then flushes its journal entries to disk with transaction A1:92 in the "committed" state, in parallel with sending "committed" messages to the child commit coordinators for Segments C1 and D1, also sent in parallel. The primary commit coordinators for Segments C1 and D1, upon receiving "committed" from their parent then commit transaction A1:92 by first checkpointing "committing" to the backup commit coordinators for Segments C2 and D2 (in parallel, correspondingly), then flushing (in parallel) their journal entries to disk with transaction id A1:92 in the "committed" state and (because there are no great-grandchildren) checkpointing "committed" to the backup commit coordinators for Segments C2 and D2 (in parallel, correspondingly).

The moment that any primary participant (Segment A1, B1, or C1) has become durably "committed" (having written "committed" into that segment's journal), each is then free to write the committed transaction out (make the metadata changes visible) to the physical file system on its segment. Moreover, each is free as well to mark the transaction record for garbage collection in their corresponding segment server journal. This may be done asynchronously and/or by observing a second longer timeout and flushing all committed transactions at that point. The commit coordinator for Segment A1 writes out and makes visible the two new dentrys to the physical file system; the commit coordinator for Segment B1 writes out and makes visible the two new inodes; and the commit coordinators for Segments C1 and D1 remove and make invisible the two old dentrys and two old inodes.

After the journal I/O completes on grandchildren Segments C1 and D1, the following transactions occur. It is noted that there are no great-grandchildren for this example. First, "committed" is replied to the parent primary Segment B1 and then "forgetting" is checkpointed to the backup commit coordinators for segments C2 and D2 (in parallel, correspondingly). After the journal I/O completes on Segment B1 and the changes have been made visible in Segment B1's physical file system state, the following occurs. First, "committed" is replied to the parent primary Segment A1 and then "forgetting" is checkpointed to the backup commit coordinator for Segment B2. After the disk I/O completes for primary Segment A1, the changes have been made visible and having received the "committed" reply from the child on primary Segment D1, "forgetting" is then checkpointed to backup Segment A2. Now, the entire transaction A1:92 network (directed graph) is in garbage collection, which is flushed to disk the next time the flush timer expires.

To summarize, the network (directed graph) journal order is as follows. "Prepared" is written in bottom-up order (first D1 and C1, then B1 and lastly A1), "committed" is written in top-down order (first A1, then B1 and lastly C1 and D1). The metadata may be made visible in parallel after the "committed" state is durable on any branch. However, these metadata and physical file system changes may be made concurrently to the commit process if the changes may be rolled back deterministically.

A failure of any primary commit coordinator for a segment server results in a transparent takeover by the backup commit coordinator, who goes down the list of transactions and their last checkpointed state, as follows: 1.) "active" transactions get no action; 2.) "aborting" transactions may continue to abort unless there is "lost undo" (undo not applied properly) from the failure of the process of aborting, in which case they are aborted again; 3.) "preparing" transactions are flushed (possibly again) and their children get prepared (possibly again, which may result in an abort if the session loss between them was not transparently masked in the takeover); 4.) "prepared" transactions write a (possibly extra) "prepared" record to the journal then reply "prepared" to seek commit/abort knowledge from their parent; 5.) "committing" transactions write a (possibly extra) "committed" record to the journal, then check to see if the changes were made visible in the distributed file system and complete or repair it if necessary, and then commit all of their children again; 6.) "committed" transactions commit all of their children again; and 7.) "forgetting" transactions reply "committed" again to the parent segment server, unless the current node is the original parent.

A double failure of any commit coordinator pair for a segment server (typically the failure of the new primary coordinator during the backup repair window from a previous failure) results in a crash recovery from the journal transaction history and is handled similarly to crashes in two phase commit, according to the final historic transaction state record for every transaction: 1.) "active" transactions at the time of the crash are aborted and send aborts to any parents and children; 2.) "aborting" transactions get aborted again; 3.) "prepared" transactions seek commit/abort knowledge from their parents; 4.) "committed" transactions check to see if the transaction changes were made visible in the distributed file system and complete or repair it if necessary, and then send committed to all of their children again; and 5.) "forgotten" transactions (records marked for garbage collection) are ignored.

Optimizations may be used to minimize overhead in messaging and flush time handling used in connection with the three phase commit, if the transaction state changes are checkpointed from the primary commit coordinators to the backup commit coordinators at the times listed in the above protocol.

The optimization may be as follows, in accordance with example implementations. The above-described implementations may not be realistic on actual hardware because the implementations means that all of the primary nodes stay in lockstep with each flush timeout and further mean that the prepare phase of each transaction is performed synchronously and in parallel on each node participating in a transaction. However, it is safe for any primary participant node to flush its preparing operations asynchronously any time prior to the "prepared" message being received. This allows the participant nodes to flush on their own timers and keeps the system from being in lockstep for the two I/Os required. The resultant system attempts to durably store every metadata change in the cluster within two flush delays, and does not perform any extra disk I/O. It is an "attempt" because the commit coordinator waits until it has received all "prepared" messages from all participants before it can do the disk I/O for its operation, and if there are network delays or down segments, then the operation may be delayed beyond the two flush windows.

Figure 6:
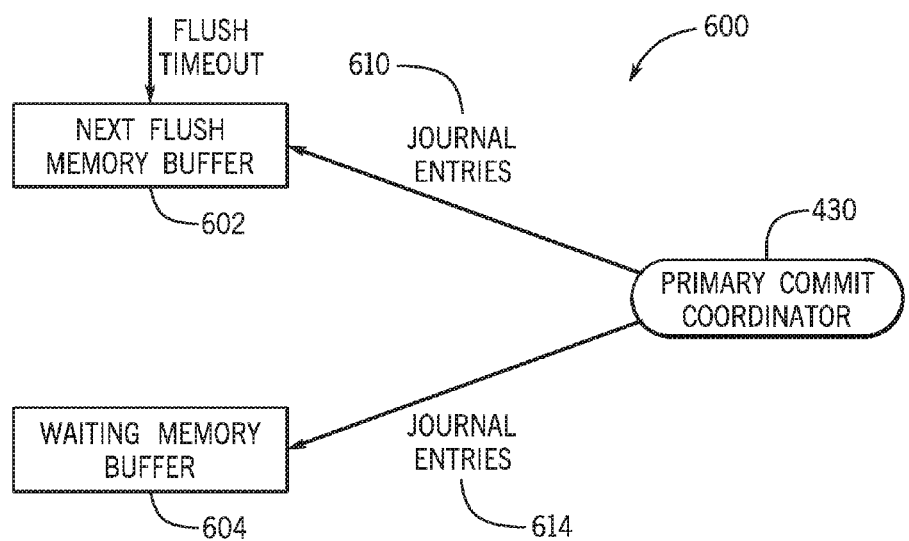
FIG. 6 is an illustration of the use of multiple memory buffers by a primary commit coordinator to regulate when journal entries are flushed according to an example implementation.

Referring to FIG. 6, as an illustration 600 of a way to use two flush windows, a given primary commit coordinator 430 may use two separate in-memory buffers 602 and 604. The memory buffer 602 is used for a "flush this next flush timeout" journal entries 610; and the other memory buffer 604 is used for "wait until it is okay to flush these" journal entries. When a node participates in a distributed transaction, if it is a transaction child participant, the journal entry for that transaction immediately goes into the "flush this next flush timeout" buffer 602. If it is the transaction parent coordinator node, the journal entry goes into the "wait until it is okay to flush these" buffer 604. At the designed metadata journal flush time (ten seconds, for example), the node flushes all participant journal entries as well as all committed coordinator transaction entries (from a previous window). At some time before the next designated metadata journal flush time, (for example, at nine to ten seconds), the node batches up messages for each segment server that it needs to communicate with, including "prepare" messages for all transactions for which it is the coordinator node and waits for replies.

On transaction child nodes, the transaction has been flushed to disk in the last journal flush timeout, and the participant node may immediately return a "prepared" message. For those transactions for which the coordinator receives all "prepared" replies, the coordinator moves those transactions into the "flush this next flush timeout" buffer 602 to be flushed to disk. If those messages are received before the ten second flush timeout comes (one second later in the example time from above), the transaction is committed to disk at that point. If there are messages missing, either because of down nodes, or very busy nodes, then that coordinator transaction remains in the "wait until it is okay to flush these" buffer.

After some timeout, the coordinator resends the "prepare" message to the nodes that have not replied (or perhaps all nodes in the transaction as a heartbeat that the coordinator is still alive and waiting for a slow node). If segment double failure occurs before the coordinator receives the "prepared" reply from all children participants, the transaction is aborted. The coordinator keeps retrying until an abort or success occurs.

Adding the above-described optimization to the basic protocol, in accordance with example implementations, does not affect integrity because ordering of durable operations is maintained, i.e. participant entries are written before "prepared" replies are returned to the coordinator, the commit record is always forced to disk before the "committed" message is sent to all child participants, and no child participant flushes its operation to the physical file system until the transaction either commits or aborts. Additionally, the flush behavior of each node is decoupled to a degree. If a node is particularly busy and cannot flush its transaction records within the first flush window, then when it receives "prepare" messages from the parent coordinators for those transactions, it will slow those transactions down.

All other transactions that are not affected by this node's slowdown may continue to commit within the twenty second window (even on nodes that have other transactions in addition to the ones for which they are waiting to hear back about from the slow node). This bounds the effect of a slow node on other nodes to however many transactions it is a child participant in that cannot be flushed in the ten second (as an example) flush window. It bounds the effect of a slow node as the parent coordinator for transactions to however many transactions it can send "prepare" messages for and receive replies in the expected time before the flush commit timeout. It also gives a natural feedback mechanism to the file allocation policy and/or file migration mechanism indicating where possible hotspots may be in the system. If the system automatically profiles this slowdown and finds that it is consistently a problem over a longer time window, then file allocation policy may be altered and/or data migration may be initiated to alleviate the hot spot.

Transport Control Protocol/Internet Protocol (TCP/IP) may have challenges creating new connections when a node is overloaded but may often deliver TCP messages to existing open connections. When an operation occurs on two or more nodes, a TCP/IP connection is established between the coordinator journal writer and the participant journal writes on those nodes in preparation for the messaging to occur shortly between them. This connection may be used for all transactions that occur between these participants, (i.e. it can be cached and reused), and it can age out if there has not been a transaction connecting those nodes in a certain time (or it can remain open all the time). The details may be evaluated with an overloaded system to understand the failure modes and now best to mitigate them and continue to make steady transaction progress.

In accordance with example implementations, if the client desires that the transaction is to be made durable, the client may call a synchronization function (called "sync( )") after the client performs the operation; and this call forces the rest of the protocol to be run before returning success for the sync( ) operation back to the user, potentially forcing inefficient flushes of participant records and the coordinator record for the transaction in order to push the data out to the physical file system.

If the client desires for all of the file accesses to be transactionally durable, the client mounts the file system "sync" or with a flag called the "O_DIRECT flag." In this case, instead of writing transaction records in-memory and then returning success, the protocol above will be run synchronously for each transaction, and the client may success when the two phase commit protocol has returned "committed" and the data has been flushed to the physical file system. If there are multiple clients operating in parallel on an O_DIRECT mounted file system, the above protocol can still group the individual transaction commits together into one disk I/O, improving throughput in that case.

Figure 7:
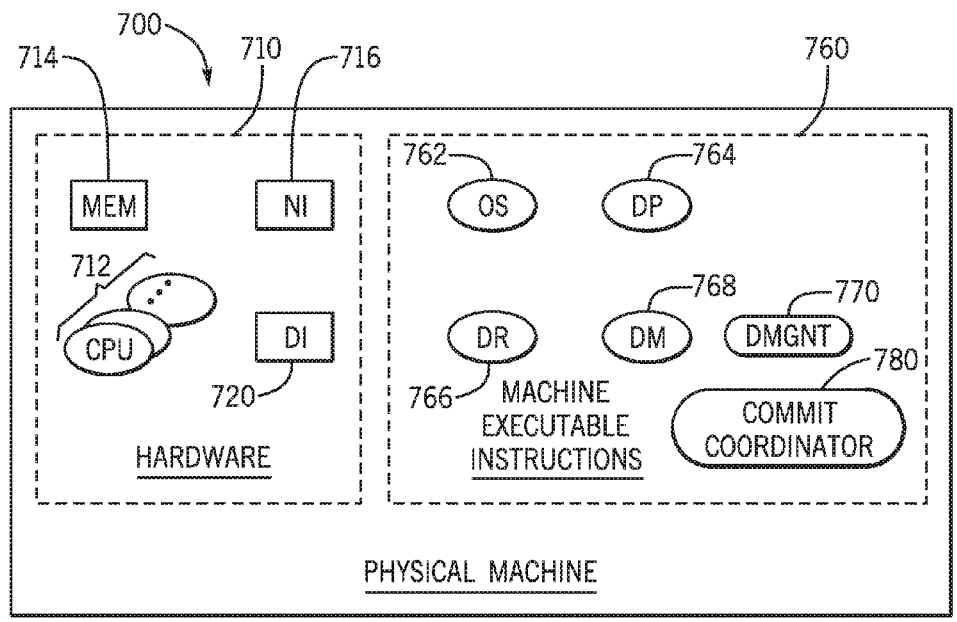
FIG. 7 is a schematic diagram of a physical machine according to an example implementation.

Referring to FIG. 7, in accordance with example implementations, a given node may be a physical machine 700. In this regard, the physical machine 700 is an actual machine that is made up of actual hardware 710 and actual machine executable instructions 760, or "software." In general, the hardware 710 may contain, for example, one or multiple central processing units (CPUs) or processing cores, a memory 714, a network interface 716, a storage device interface 720 and so forth. The machine executable instructions 760 may include, as examples, instructions that when executed by the CPU(s) 712 cause the CPU(s) 712 to form one or more software components, such as an operating system 762, a data protection component 764, a data retention component 766, a data mobility component 768, a data management component 770, a commit coordinator 780, and so forth.

While the present techniques have been described with respect to a number of embodiments, it will be appreciated that numerous modifications and variations may be applicable therefrom. It is intended that the appended claims cover all such modifications and variations as fall within the scope of the present techniques.

What is claimed is:

1. A method comprising:
using a primary commit coordinator in a distributed file system as a participant in at least one transaction associated with a file operation to commit the at least one transaction to an associated storage segment of the file system;
using the primary commit coordinator to communicate with at least one other participant in the at least one transaction using a three phase commit protocol to generate transaction states associated with committing the at least one transaction; and
selectively checkpointing the transaction states to a backup commit coordinator associated with the primary commit coordinator to allow the backup commit coordinator to takeover committing the at least one transaction.

2. The method of claim 1, wherein the primary commit coordinator and the backup commit coordinator form a commit coordinator pair, and using the primary commit coordinator to communicate comprises using the primary commit coordinator to communicate with at least one other primary coordinator of at least one other commit coordinator pair to commit at least one of transaction of the file operation.

3. The method of claim 1, further comprising:
using the primary commit coordinator to selectively generate a durable journal of the transaction states.

4. The method of claim 3, further comprising:
using the durable journal in a crash recovery operation in response to failure of the primary commit coordinator and failure of the backup commit coordinator.

5. The method of claim 1, wherein the transaction states comprise a primary state, a preparing state, a prepared state, a committing state, a committed state and a forgotten state; the method further comprising:
using the backup commit coordinator to takeover for the primary commit coordinator in the event that the primary commit coordinator fails by processing the transaction states.

6. The method of claim 1, wherein the selectively checkpointing comprises selectively checkpointing the transactions states for a sequence of multiple file operations to allow the backup commit coordinator to takeover committing the at least one transaction.

7. The method of claim 1, wherein using the primary commit coordinator to communicate using the three phase commit comprises using a protocol having a prepare phase, a commit phase and a forget phase.

8. An apparatus comprising:
a storage unit; and
a primary commit coordinator of a distributed file systems, the primary coordinator to:

participate in at least one transaction associated with a file operation to commit the at least one transaction to the storage unit;

communicate with at least one other participant of the distributed file system in the at least one transaction using a three phase commit protocol to generate transaction states associated with committing the at least one transaction; and communicate with a backup commit coordinator of the distributed file system to selectively checkpoint the transaction states to allow the backup commit coordinator to takeover committing the at least one transaction in the event that the primary commit coordinator fails.

9. The apparatus of claim 8, further comprising a server couplet comprising a first node associated with the storage unit, a second node associated with another storage unit, wherein the first node comprises the primary commit coordinator and the second node comprises the backup commit coordinator.

10. The apparatus of claim 8, further comprising a server couplet comprising a first node associated with the storage unit, a second node associated with another storage unit, wherein the first node comprises the primary commit coordinator and the backup commit coordinator is part of another server couplet.

11. The apparatus of claim 8, further comprising:

a first memory buffer to be flushed resulting in contents of the first memory buffer becoming durable in response to a flush timeout; and a second memory buffer, wherein the primary commit coordinator:

in response to primary commit coordinator being a child node participant in the at least one transaction, stores journal entries representing the transaction states in the first memory;

primary commit coordinator being a child node participant in the at least one transaction, stores the journal entries in the second memory and selectively moves the journal entries into the second memory based on the transaction states.

12. The apparatus of claim 8, wherein using the three phase commit comprises a prepare phase, a commit phase and a forget phase.

13. An article comprising a non-transitory computer readable storage medium to store instructions that when executed by a computer cause the computer to:

use a primary commit coordinator in a distributed file system as a participant in at least one transaction associated with a file operation to commit the at least one transaction to an associated storage segment of the file system;

use the primary commit coordinator to communicate with at least one other participant in the at least one transaction using a three phase commit protocol to generate transaction states associated with committing the at least one transaction; and selectively checkpoint the transaction states to a backup commit coordinator associated with the primary commit coordinator to allow the backup commit coordinator to takeover committing the at least one transaction.

14. The article of claim 13, the storage medium storing instructions that when executed by the computer cause the computer to use the primary commit coordinator to selectively generate a durable journal of the transaction states.

15. The article of claim 13, wherein the transactions states comprise an primary state, a preparing state, a prepared stated, a committing state, a committed state and a forgotten state, and the storage medium storing instructions that when executed by the computer cause the computer to use the backup commit coordinator to takeover for the primary commit coordinator by processing the transaction states.

* * * * *